US009567192B2

(12) United States Patent
Tuenkers

(10) Patent No.: US 9,567,192 B2
(45) Date of Patent: Feb. 14, 2017

(54) OSCILLATION DAMPER FOR VIBRATION DRIVERS

(71) Applicant: Tünkers Maschinenbau GmbH, Ratingen (DE)

(72) Inventor: Josef-Gerhard Tuenkers, Ratingen (DE)

(73) Assignee: TUNKERS MASCHINENBAU GMBH, Ratingen (DE)

( * ) Notice: Subject to any disclaimer, the term of this patent is extended or adjusted under 35 U.S.C. 154(b) by 0 days.

(21) Appl. No.: 14/568,380

(22) Filed: Dec. 12, 2014

(65) Prior Publication Data
US 2015/0166309 A1 Jun. 18, 2015

(30) Foreign Application Priority Data

Dec. 13, 2013 (DE) .................... 20 2013 011 172 U

(51) Int. Cl.
| B66C 13/06 | (2006.01) |
| E02D 7/18 | (2006.01) |
| F16F 1/373 | (2006.01) |
| F16F 3/087 | (2006.01) |
| F16F 3/10 | (2006.01) |

(52) U.S. Cl.
CPC .................. B66C 13/06 (2013.01); E02D 7/18 (2013.01); F16F 1/3732 (2013.01); F16F 3/0876 (2013.01); F16F 3/10 (2013.01)

(58) Field of Classification Search
CPC .............. E02D 7/18; B66C 13/06; F16F 3/10; F16F 3/0876; F16F 1/3732

USPC ... 267/140.4, 141, 153, 293, 141.3; 188/380
See application file for complete search history.

(56) References Cited

U.S. PATENT DOCUMENTS 1,404,031 A * 1/1922 Kelman ................. B60N 2/502
248/562
2,612,370 A * 9/1952 Eger ...................... B60G 11/22
267/140.4
(Continued)

FOREIGN PATENT DOCUMENTS

DE 2823953 A1 12/1979
FR 2427433 A1 12/1979
(Continued)

Primary Examiner — Thomas J Williams
Assistant Examiner — Mariano Sy
(74) Attorney, Agent, or Firm — Fitch, Even, Tabin and Flannery LLP

(57) ABSTRACT

An oscillation damper for vibration drivers for suspension from a load-bearing means displays a damping body connected on its opposite end faces to pressure bodies which are variable in their spacing, having a rigid support element which is assigned to the load-bearing means and a rigid support element which is assigned to the vibration driver. The two support elements are connected in an articulated manner by way of flexible ties to each pressure body. The longitudinal axes of the ties form in each case an acute angle with the vertical that decreases as tensile force increases, on account of which high tensile forces can be introduced onto the damping body. Simultaneously with the churning operation of the damping body a pendulum movement of the laterally disposed pressure bodies about the articulations of the ties takes place, on account of which vertical oscillation is largely eliminated.

15 Claims, 4 Drawing Sheets

(56) References Cited

U.S. PATENT DOCUMENTS

| | | | | |
|---|---|---|---|---|
| 2,729,441 A | * | 1/1956 | Henss | B60G 11/22 |
| | | | | 267/258 |
| 3,679,166 A | * | 7/1972 | Sturhan | B60N 2/502 |
| | | | | 248/588 |
| 3,972,390 A | * | 8/1976 | Melton | F16F 7/123 |
| | | | | 188/377 |
| 4,274,761 A | | 6/1981 | Boguth | |
| 5,676,356 A | * | 10/1997 | Ekonen | B60G 5/053 |
| | | | | 248/634 |

FOREIGN PATENT DOCUMENTS

| | | | |
|---|---|---|---|
| GB | 2027159 A | | 2/1980 |
| JP | 62017437 A | * | 1/1987 |

\* cited by examiner

OSCILLATION DAMPER FOR VIBRATION DRIVERS

The invention relates to an oscillation damper for vibration drivers for suspension from a load-bearing means, having one or more damping bodies which is/are configured as hollow rubber springs and is/are disposed in each case between two pressure bodies which are spaced apart and composed of steel, wherein the damping body or the damping bodies is or are disposed in a parallelogram linkage system which is capable of oscillation, on account of which, even at the highest tensile load, the vertical oscillation introduced from the piling or drawing apparatus is largely eliminated and, on account thereof, is not introducible into the load cable or similar of the load-bearing means.

PRIOR ART

By way of DE 28 23 953 C2 and FR 2 427 433, GB 2 027 159 A and U.S. Pat. No. 4,274,761 (all of identical content), a suspension device for vibration drivers on a load-bearing means (a crane hook or similar) having an elastic oscillation damper which is disposed between the vibration driver and the load-bearing means, which damper displays at least one elastic damping body which on its ends is connected to pressure plates, having variable spacing, which are connectable by way of at least one tie—cable, belt, wire, or similar—which is of modifiable shape to the load-bearing means, on the one hand, and to the vibration driver, on the other hand, has been previously known. The oscillation damper displays two support plates which are disposed so as to be spaced apart in the direction of tension, of which one support plate is connectable to the load-bearing means and the other support plate to the vibration driver, wherein the damping body, with the pressure plates, with its longitudinal axis is disposed transversely to the direction of tension in the free space between the two support plates, wherein either a single endless sling which is fastened to the support and pressure plates serves as a tension means, or that four endless slings are in each case fastened on one support plate and on one pressure plate. The damping body is a hollow body of rubber or of an elastic plastic material. Moreover, the damping body is hollow cylindrical or configured so as to taper into a hollow cone toward its ends. In each case one of the ties is coupled in an articulated manner to both the upper and also the lower end of each pressure plate, and the other side of these ties is coupled in an articulated manner to the support plates. The ties, in each case on their ends, form eyelets by way of which they are pushed onto horizontal bolts, in order to form oscillation articulations.

It is disadvantageous in this previously known design that two damping bodies which, in the central region, bear on a rigid disk, are disposed transversely to the direction of tension. On account thereof, an unfavorable force profile in the damping bodies and an unfavorable oscillation method result.

DE 675 502 shows a spring system, in particular for motor vehicles, having an elastic tension belt which is placed about two rollers which are movable in relation to one another. The two strands of the elastic tension belt, in the center between the rollers, are embraced by an elastic cross belt and, in the unloaded state, are drawn-in in an angular manner, such that an exaggerated spring characteristic is realized in the spring compression operation. Instead of the cross belt, an elastic pressure body which, in the unloaded state, spreads apart the free belt lengths of the tension belt in an angular manner may also be provided.

A suspension device constructed from rigid articulations, which is interconnected by axles running in parallel to one another, has been previously known from GB 4 91 031, wherein in the central region a compression spring composed of steel, which on its ends bears in each case on a lever element, is disposed.

Object

The invention is based on the object of improving an oscillation damper of the generic type implied such that a better damping performance of the oscillations in relation to the load-bearing means which are generated when working by means of vibration drivers is provided.

Solution

The object is achieved in at least one embodiment by a single or plurality of damping bodies configured as hollow springs and composed of rubber, for example a natural rubber mixture, or of an elastomer which displays rubber-type properties, connected at opposite end sides to pressure bodies variable in their spacing. High tensile forces can be introduced upon the damping bodies by connecting the pressure bodies to two rigid support elements via flexible ties at points of articulation, such that when a tensile force is applied along a vertical axis of the support elements the angle ($\alpha$) between longitudinal axis of the ties and the vertical axis of the support elements decreases. Simultaneously with the churning operation of the damping bodies, a pendulum movement of the pressure bodies about the points of articulation of the ties may be induced. The pendulum movement of the pressure bodies allows oscillations introduced form a piling or drawing apparatus connected to one of the support elements to be largely eliminated and not introducible into a tie connected to the other support element.

Some Advantages

In the case of the suspension device according to the invention, at least one damping body which displays rubber-type properties and is overall materially integral is disposed between two pressure plates which are composed of a rigid material, in particular of steel. This damping body is designed so as to be approximately barrel-shaped and enables excellent oscillation damping properties when working by means of vibration drivers, even when transmitting comparatively high centrifugal forces. Here, the pressure plates are always held in a functionally integral manner on the end sides of the materially integral damping body, such that a force introduction across a wide area is provided from the pressure plates onto the damping body. The horizontally disposed damping body configured as a hollow rubber spring, or the identically designed damping bodies which are disposed so as to be parallel to one another and which are configured as hollow rubber springs assumes/assume the oscillation-insulating function. As the tensile force increases, the angle $\alpha$ decreases, in each case measured between, for example, one of the upper directional elements and an imaginary vertical line, on account of which the compressive load of the hollow rubber spring decreases in a proportional manner to the tensile force. It is practically possible in this manner to introduce high tensile forces (high pre-tensile forces in the case of heavy drawing work) into the piling and drawing apparatus, without the damping bodies which are configured as a hollow rubber spring being overloaded. Simultaneously to the churning operation of the hollow rubber spring, on account of the geometrically disposed lever-arm elements a pendulum movement of the laterally disposed pressure bodies which are configured as steel plates takes place about the upper articulation points. On account thereof, even at the highest tensile load, the vertical oscillation introduced from the piling and drawing apparatus is eliminated and not transmitted into the load cable of the supporting apparatus. When mention is made of "hollow rubber springs", this is not necessarily to be understood as a natural rubber but optionally as a natural rubber mixture or as a plastic material which displays rubber-type properties, for example a polyurethane plastic or some other elastomer which is resistant to aggressive agents encountered on construction sites, such as greases, oils, gasoline, types of water, and which is also resistant to ozone and light radiation, and has the required resistance to abrasion. When mention is made that the oscillation damper is connected to the load-bearing means, on the one hand, and to the vibration driver, on the other hand, this may, of course, also take place in an indirect manner, that is to say that other elements, such as grommets, shackles, cable strands, chains, or similar, may also be disposed in between.

In an embodiment, a plurality of damping bodies, of the same size, may be disposed between the plate-shaped pressure bodies composed of steel, wherein the damping bodies with their longitudinal axes are deputized so as to be parallel to one another, at slight spacing from one another, preferably at gap spacing, in such a manner that they do not obstruct one another during operation. It is advantageous, for example, to dispose two damping bodies of such type, of the same size and same shape, which are configured as hollow rubber springs, beside on another. In another embodiment, the respective damping body may be disposed in an oscillatory manner between the pressure plates and the two support members may be connected to the pressure plates by movable rigid lever-arm elements.

Further Inventive Designs

Further inventive designs are described below.

A possible embodiment may have the lever-arm elements or flexible ties, on their end regions, connected to the assigned support element, on the one hand, and to the respectively assigned pressure body, on the other hand, by way of articulations. On account thereof, a free-moving oscillation potential of the overall structure results.

An embodiment, particularly advantageous, may have steel cables or steel cable loops as the lever-arm elements. Lever-arm elements of such type which are composed of steel cables can adapt to the oscillations in a particularly easy manner. Steel cable or steel cable loop lever arms may be connected to the support elements or the pressure bodies in an articulated manner by way of bolt bearings.

An advantageous and rugged embodiment may have the longitudinal axes of bolt bearings connecting steel cable or steel cable loop lever arms to the support elements or the pressure bodies running parallel to one another.

In the case of an embodiment in which the lever-arm elements are endless loops of steel cables disposed by way of bolt bearings, the lever-arm elements are very rugged and in each case enable free oscillation, in particular by way of the upper articulation points.

An embodiment is also possible in which the lever-arm elements are rigid bodies, in particular composed of steel, which on their end regions display bearings which, by way of articulations, are in each case coupled to one another in an oscillatory manner by means of the upper support element or the lower support element. These bearings may be spatial articulations, or else articulations which enable in each case oscillation only in one plane.

An embodiment, which may be particularly advantageous, may have the damping body or the damping bodies practically disposed in a parallelogram linkage system which is capable of oscillation, which is/are formed by the pressure bodies, on the one hand, and by the bearing center points of the lever-arm elements, on the other hand. On account thereof, particularly in the case of high tensile loads, practically all damaging oscillations which could be transmitted onto the load-bearing means, for example onto a crane hook, are eliminated.

Damping bodies which are designed so as to be barrel-shaped and which are particularly hardwearing in the rough operation on construction sites, and thus under extreme conditions.

A particularly advantageous embodiment may comprise a resilient coupling element passing through a clearance in the damping body and connected to the two pressure bodies. The coupling element may be composed of an elastic plastic material.

The pressure plates may be connected to one another by a coupling element which is configured as a steel cable axially engaging through the damping body. If and when required, this coupling element may be a bar or a body which is composed of an elastic plastic material displaying rubber-type properties and which, under pre-tensioning, presses the two pressure plates against one another and thus against the end side of the damping element disposed in between.

In a further particularly advantageous embodiment, the coupling element is configured as a helical spring composed of steel, which is installed under pre-tensioning. The pre-tensioning may be optionally adjustable also during operation and also be arrestable under the respective pre-tensioning. To this end, the bearings on the pressure bodies, at least on one side for the coupling element, can be adjusted and arrested. The helical spring may comprise one or multiple windings.

Further advantageous embodiments of the invention may comprise a damping body comprising a central cylindrical region and two longitudinal end portions tapering off towards the ends of the damping body in a conical manner. Embodiments of the damping body may comprise a clearance passing through the damping body. A clearance passing through the dampening body may comprise cylindrical end regions connected to a cylindrical central region by two truncated cone regions widening in the direction of the cylindrical central region. Embodiments of the pressure bodies may comprise rigid elements configured as centering sleeves or guide sleeves that engage in a form-fitting manner clearances within the damping body and thereby center the damping body in relation to the pressure bodies. Embodiments of the pressure bodies may include bolts running transverse to the longitudinal axis of the of the coupling element and releasably connecting the coupling element to the pressure bodies. The pre-tensioning of the coupling element may be adjustable when a bearing of the pressure body is adjustable and also arrestable in the desired position. Embodiments of the support elements may comprise two steel plates spaced apart from one another and bolts extending between the steel plates upon which lever arm elements are disposed. Such support members can accommodate lever arms configured as steel cables and steel cables endless loops, s well as other lever arms.

The invention is visualized—in part in a schematic manner—in the drawing, using exemplary embodiments. In the drawing.

Figure 1:
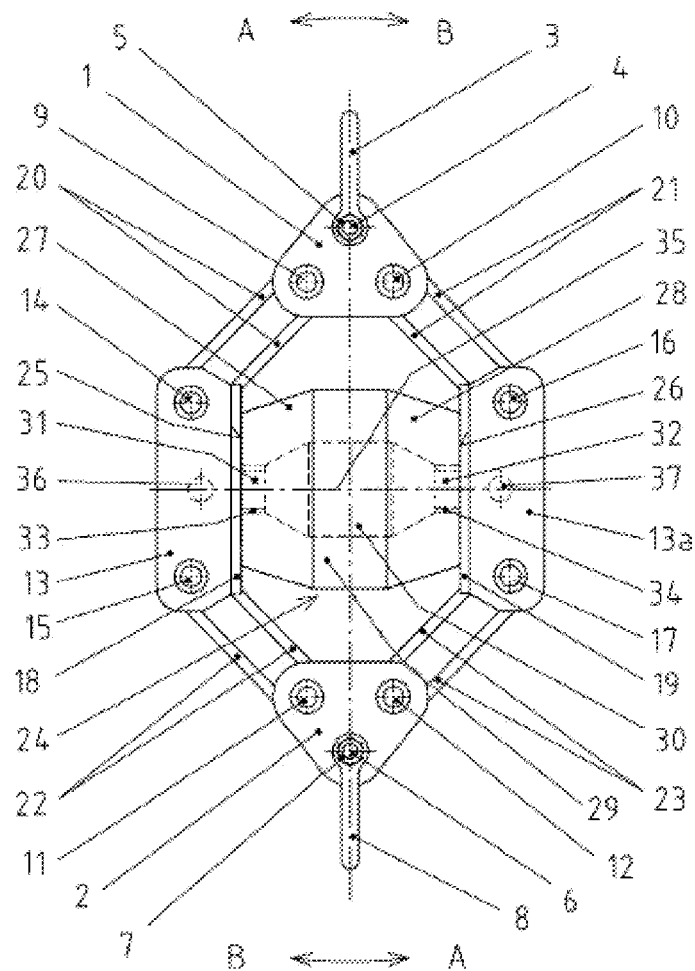
FIG. 1 shows an oscillation damper in the side view, having a damping body which is designed so as to be approximately barrel-shaped.

Reference signs 1 and 2 identify support elements composed of steel, which, as can be seen from the side view in FIG. 1, are approximately triangular, and which may also be composed of two tabular elements, of same size and same shape, which are spaced apart and disposed so as to be parallel to one another. In the case of the illustrated embodiments, the support elements 1 and 2 are formed in the shape of an approximately equilateral triangle, wherein the tips of the triangular support elements 1 and 2 are disposed so as to be offset by 180° from one another.

The support element 1 identifies a load-bearing means which may be coupled to a crane hook or similar, for example, and which is coupled in a pivotally moving manner in the direction A and/or B to the support plate 1 by way of a pivot axle 4. The pivot axle 4 engages through a boring (not described in more detail) of the support element 1, wherein the pivot axle 4 is releasably arrested by way of suitable means, for example by way of a counternut 5. The pivot axle may be a stud bolt.

Also releasably connected by way of a counternut 7 or similar to the support element 2, in the region of the tip of the triangle, is a pivot axle 6 which likewise permits a pivot movement within limits of a load-bearing means 8 in the direction A and/or B. The load-bearing means 8 may be releasably coupled to a vibration driver (not illustrated).

At 9 and 10 of the support element 1, on the one hand, and/or at 11 and 12 of the support element 2, on the other hand, bolts are disposed in the corner regions of the triangular support elements 1, 2. Both the pivot axles 4 and 6, and also the bolts 9 to 12, are composed of steel in the case of the illustrated embodiments, and may be stud bolts.

At 13, 13*a*, pressure bodies which are likewise composed of steel and which in each case display in their end regions bearing elements 14, 15 and/or 16, 17, which are configured as bolts and the longitudinal axes thereof are disposed so as to be parallel to the longitudinal axes of the pivot axles 4 and 6 and the bolts 9 to 12, are disposed.

The pivot axles 4 and 6, on the one hand, and the bolts 9, 10 and 11, 12, on the other hand, are of same size and same shape, and in the case of the illustrated embodiments are specifically configured so as to be circular in cross section. Also the bolts 14, 15, on the one hand, and 16, 17, on the other hand, are of same size and same shape, and in the illustrated embodiment likewise designed so as to be circular in cross section, and are composed of steel. Both the bolts 9, 10 and/or 11, 12, on the one hand, and also the bolts 14, 15 and 16, 17, on the other hand, may however also have a design which deviates from the cylindrical shape, if this should prove necessary or expedient.

The pressure bodies 13 and 13*a*, on their ends facing one another, display pressure plates 18 and/or 19 which are connected to the respective pressure body 13 and/or 13*a* in an integral manner, in particular in a materially integral manner or a functionally integral manner, in the latter case, for example, by way of screws or weldseams or similar, wherein the pressure plates 18 and 19, like the pressure bodies 13 and 13*a*, are preferably composed of steel.

The bolts 9 and 10 of the support element 1 are movably coupled by way of flexible ties 20 and/or 21 to the bolts 14 and/or 16 of the pressure bodies 13 and/or 13*a*. The ties 20 and 21 may be endless loops of steel cables which place themselves around the bolts 9 and 10, on the one hand, and the bolts 14 and 16, on the other hand.

Also the bolts 15 and/or 17 are coupled by way of flexible ties 22 and/or 23 to the bolt 11 and/or 12. Also the ties 22, 23 may be configured as endless loops of steel cables and be placed around the bolts 15, 17, on the one hand, and/or 11, 12, on the other hand.

The flexible ties 20, 21 and 22, 23 may be designed as steel cables, belts, or chains, but preferably as steel cables, and connect the respective bolts 9, 10 and 14, 16 and/or 15, 17 and 11, 12 to one another in an articulated and flexible manner.

Between the pressure plates 18 and 19 of the pressure bodies 13 and 13*a*, a materially integral, barrel-shaped damping body 24 which, with its end sides 25 and/or 26, bears practically without play on the respectively assigned pressure plate 18 and 19 of the pressure bodies 13, 13*a* is disposed. In the case of the illustrated embodiment, the damping body 24 is composed in a materially integral manner of a plastic material which displays elastic properties, for example of an elastomer or of a natural rubber mixture. In the case of the illustrated embodiment the damping body 24 is composed of two conically truncated longitudinal portions 27 and 28 which are directed toward one another and which, in the central longitudinal region of the damping body 24, are connected to one another in a materially integral manner by way of a cylindrical longitudinal portion 29. In contrast to the illustrated embodiment, the materially integral damping body 24 may also be profiled so as to be barrel-shaped, that is to say outwardly bulging in a constant curve, and display the largest diameter in its central longitudinal region.

The resilient damping body 24 display a clearance 30 which passes therethrough and which, in the central longitudinal region, is widened and which, in the opposite end regions 31, 32, is configured so as to be cylindrical. Cylindrical centering sleeves or guide sleeves 33, 34 which are connected, for example releasably, in a materially integral manner or a functionally integral manner to the assigned pressure plate 18 and/or 19, engage into these cylindrical end regions 31, 32.

As per the embodiment as per FIG. 1, a coupling element 35 in the shape of a helical tension spring composed of steel, which may be configured with one or multiple windings and which, on its ends, is fastened under pre-tensioning in bearings 36 or 37 on the pressure bodies 13 and/or 13*a*, engages through the clearance 30, in the longitudinal axis direction of the damping body 24 or the damping bodies. One or both bearings 36 and 37 may be adjustable and arrestable in the respective pre-tensioned position of the coupling element 35.

Figure 2:
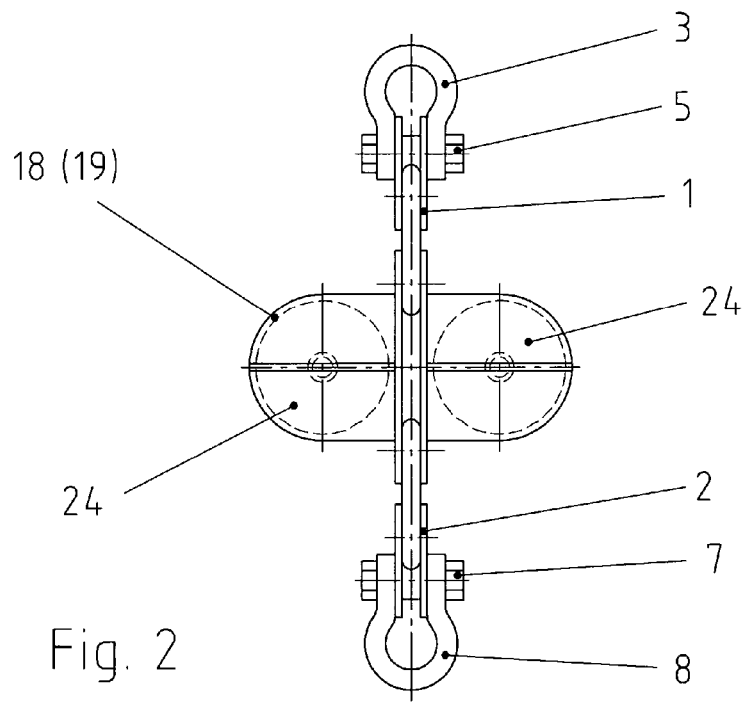
FIG. 2 shows a further embodiment of the invention, in the front view.
Figure 3:
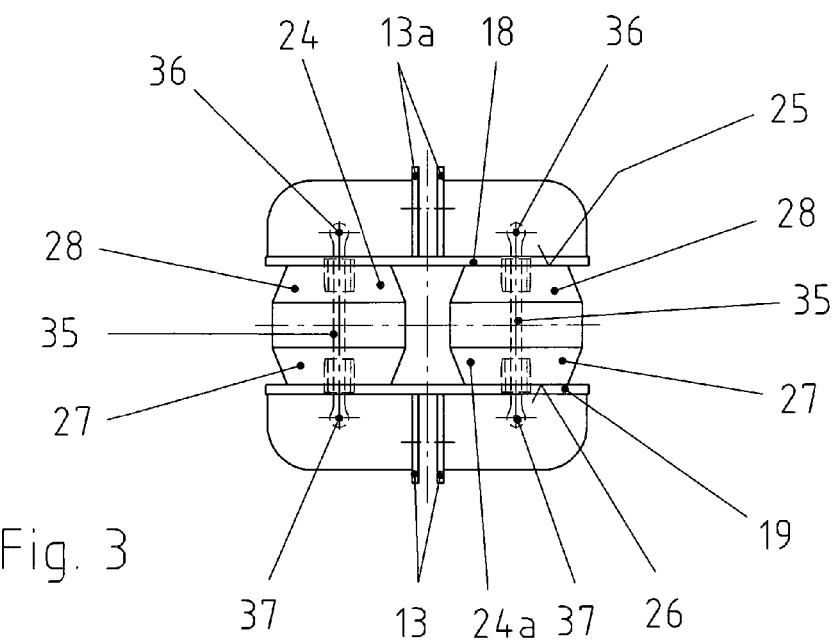
FIG. 3 shows a plan view, complementing FIG. 2.
Figure 4:
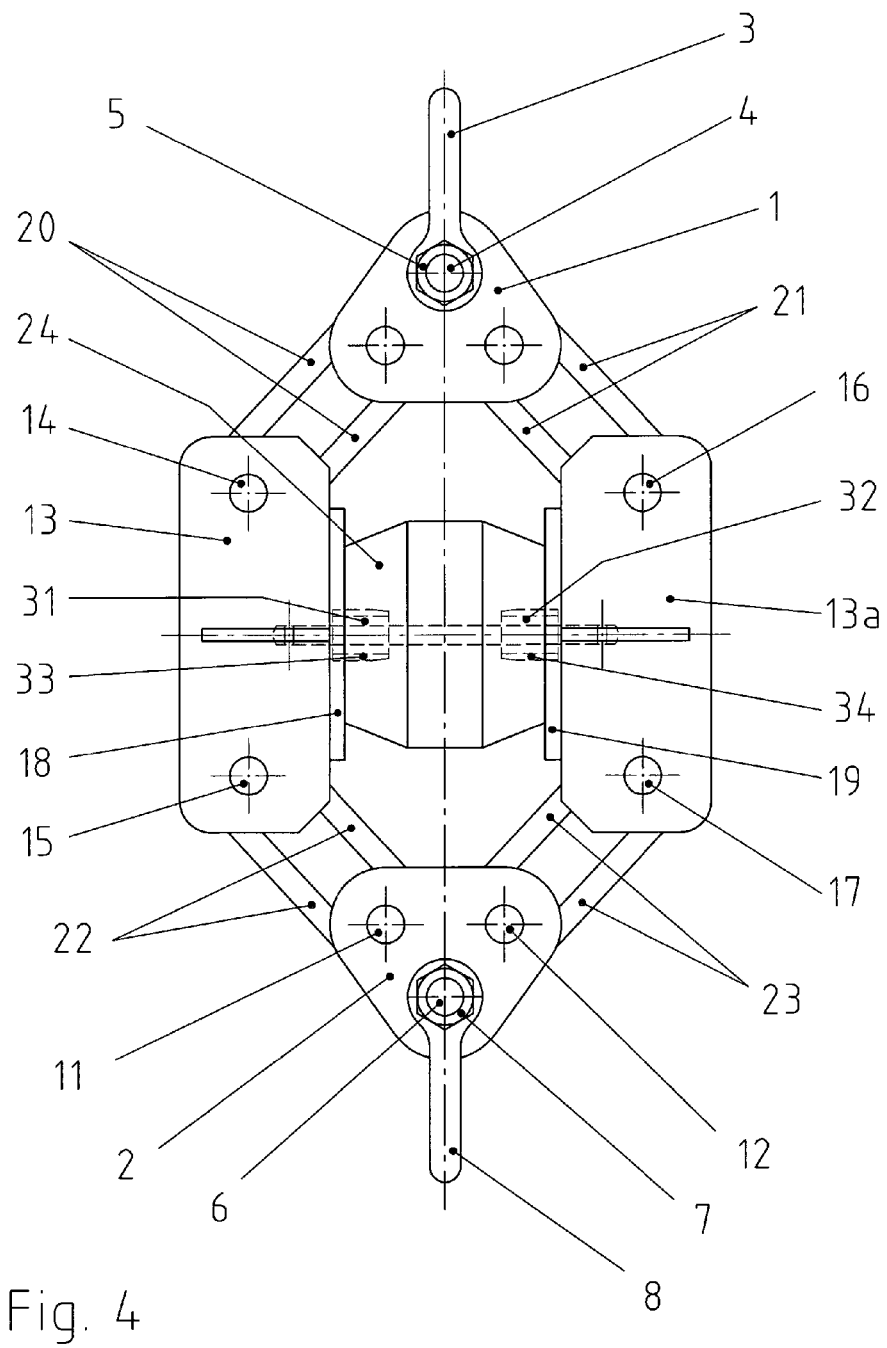
FIG. 4 shows a side view, complementing FIG. 2.

The same reference signs as in FIG. 1 have been used for same parts in the case of the exemplary embodiment as per FIGS. 2 to 4.

Figure 5:
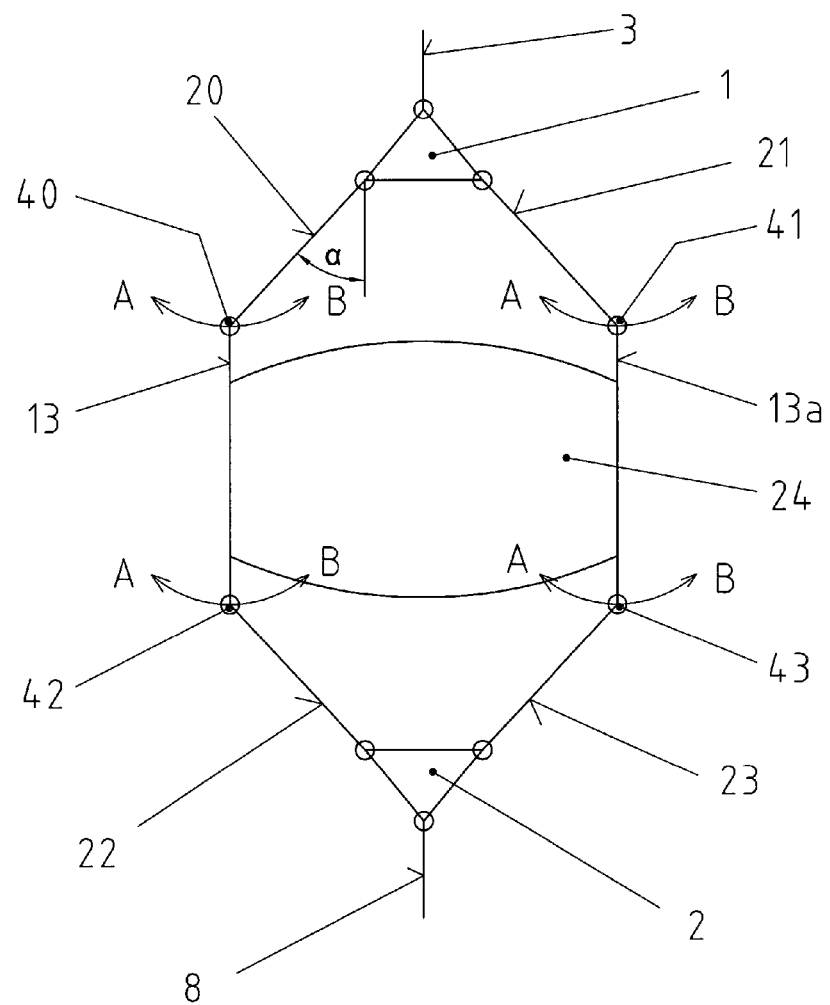
FIG. 5 shows a schematic illustration for explaining an oscillation damper and its oscillation performance.

In contrast to the embodiment as per FIG. 1, in the embodiment as per FIGS. 2 to 4, two damping bodies 24 which are of same size and same shape and, with their longitudinal axes, run parallel to one another are disposed between the pressure bodies 13, 13*a*, and their pressure plates 18, 19. The two barrel-shaped damping bodies 24, with their end sides 25 and 26, are supported in a solid manner on the pressure plates 18, 19 which face toward the former. Each of the damping bodies 24 displays a clearance, similar to the clearance 30 of the embodiment as per FIG. 1, through which in each case a coupling element 35 which is configured and disposed in a similar manner as in the case of the embodiment as per FIG. 1, engages. In contrast to the embodiment as per FIG. 1, the coupling elements 35 in the case of the embodiment as per FIGS. 2 to 4 are formed as elongate, bar-shaped bodies which are composed of a plastic material displaying rubber-type properties, but may also be helical tension springs, as is the case in the embodiment as per FIG. 5. For this purpose, the same plastic material may be used as for the damping body 24, or else another plastic material displaying resilient properties, for example polyurethane plastic. The coupling elements 35 in the case of the embodiment as per FIGS. 2 to 4 are advantageously also installed under pre-tensioning, wherein the pre-tensioning, if and when required, may likewise be adjustable and also arrestable in the respective pre-tensioned position. For this purpose, the bearings 36 and 37 may be adjustable in the axial direction, as is the case in the embodiment. If and when required, adjustment and arresting of one of the bearings will suffice.

Oscillation dampers of the type according to the invention may readily receive centrifugal forces in the order of many tons, for example more than one hundred tons, and on account thereof keep away damaging oscillations from the load-bearing means 3, for example a crane hook of an excavator, or similar.

The mode of action of the oscillation damper according to the invention is substantially as follows: As is evident in particular from FIG. 5, the flexible ties 20, 21, for example steel cables, on the one hand, connect the support element 1, which is composed of steel and is, therefore, rigid, to the respective pressure body 13 and/or 13*a*, and, on the other hand, the likewise flexible ties 22 and 23, configured in particular from steel cables, connect the support element 2 which is composed of steel and is, therefore, rigid. On account thereof, articulations result on the connection positions of the flexible ties 20, 21, 22, 23 to the support element 1, on the one hand, and/or the support element 2, on the other hand, and to the two pressure bodies 13, 13*a* on the respective connection points, such that during operation, that is to say during drawing, the damping body 24 may move between the pressure bodies 13, 13*a*. The pressure bodies 13, 13*a* here oscillate to and fro, specifically about the respective articulation points to which the ties 20, 21, 22, 23 are in each case connected. The greater the tensile force becomes, for example, the smaller is the angle α between the respective flexible tie 20, 21, 22, 23 and an imaginary vertical line which can be seen in FIG. 5. The oscillation-insulating function is assumed here in each case by the horizontally disposed damping body 24 in the embodiment as per FIG. 1, or the damping bodies 24 in the embodiment as per FIGS. 2 to 4. As the tensile force increases, the angle α decreases (FIG. 5) on account of which the compressive load of the damping body 24, which is configured as a hollow rubber spring, decreases in a proportional manner to the tensile force. In this manner it is practically possible to introduce high tensile forces—large pre-tensioning forces in the case of heavy drawing work—into the piling and drawing apparatus, without overloading the damping body 24. Simultaneously to the churning operation of the damping body 24, on account of the geometrically disposed lever-arm elements 20, 21 and/or 22, 23 a pendulum movement of the lateral pressure bodies 13, 13*a* about the upper articulations 40 and/or 41 takes place. On account thereof, even at the highest tensile load, the vertical oscillation introduced from the piling and drawing apparatus is eliminated and not transmitted into the load cable of the load-bearing means 3, on account of which damaging oscillations can be kept away from the load-bearing means 3, for example a crane hook. The lower articulations are identified with 42, 43 in FIG. 5. In this manner, an oscillatory parallelogram, between the side faces of which formed by the pressure bodies 13, 13*a* the damping body 24 or the damping bodies is/are disposed, is created.

The features which are described in the claims and in the description and which are evident from the drawing, may both individually and also in arbitrary combinations be substantial in the implementation of the invention.

LIST OF REFERENCE SIGNS

1 Support element
2 Support element
3 Load-bearing means
4 Pivot axle
5 Counternut
6 Pivot axle
7 Counternut
8 Load-bearing means
9 Bolt
10 Bolt
11 Bolt
12 Bolt
13 Pressure body
13*a* Pressure body
14 Bolt, bearing element
15 Bolt, bearing element
16 Bolt, bearing element
17 Bolt, bearing element
18 Pressure plate
19 Pressure plate
20 Tie
21 Tie
22 Tie
23 Tie
24 Damping body, materially integral
25 End side
26 End side
27 Longitudinal portion, conically truncated
28 Longitudinal portion, conically truncated
29 Longitudinal portion, cylindrical
30 Clearance
31 End region
32 End region
33 Centering and guide sleeve
34 Centering and guide sleeve
35 Coupling element
36 Bearing
37 Bearing
38 Bearing
39 Bearing
40 Articulation
41 Articulation
42 Articulation
43 Articulation
A Pivoting direction
B Pivoting direction
α Angle between ties, for example 20 or 21, and an imaginary vertical line

LITERATURE INDEX

DE 724 359
DE 675 502

DE 28 23 953 C2
U.S. Pat. No. 4,274,761
U.S. Pat. No. 2,612,370
FR 2 427 433
GB 2 027 159 A
GB 491,031

RECITALS CONTAINED IN THE DESCRIPTION

This list of documents listed by the applicant has been automatically generated and is included exclusively to provide the reader with improved information. The list does not form part of the German patent and/or utility model application. The German Patent and Trademark office accepts no liability for any errors or omissions.

CITED PATENT LITERATURE

DE 2823953 C2 [0002]
FR 2427433 [0002]
GB 2027159 A [0002]
U.S. Pat. No. 4,274,761 [0002]
DE 675502 [0004]
GB 491031 [0005]

The invention claimed is:

1. Oscillation damper for vibration drivers comprising:
   a vertical axis;
   a load-bearing means;
   a first rigid support member connected to the load bearing means;
   a second rigid support member spaced apart from the first rigid support member along the vertical axis;
   a first pressure body composed of steel;
   a second pressure body composed of steel, the second pressure body spaced apart from the first pressure body;
   a damping body comprising:
      a hollow spring composed of at least one of rubber and a resilient elastomer;
      a first end side connected to the first pressure body;
      a second end side opposite the first end side, the second end side connected to the second pressure body;
      a clearance extending from the first end side to the second end side and through the hollow spring; and
      a coupling member extending through the clearance and connected to the first pressure body and the second pressure body, said coupling member having a pre-tension pulling the first pressure body and the second pressure together;
   a first flexible tie having a longitudinal axis, the first flexible tie connected to the first pressure body at a first point of articulation, and the first flexible tie connecting the first rigid support member to the first pressure body;
   a second flexible tie having a longitudinal axis, the second flexible tie connected to the second pressure body at a second point of articulation, and the second flexible tie connecting the first rigid support member to the second pressure body;
   a third flexible tie having a longitudinal axis, the third flexible tie connected to the first pressure body at a third point of articulation, and the third flexible tie connecting the second rigid support member to the first pressure body; and
   a fourth flexible tie having a longitudinal axis, the fourth flexible tie connected to the second pressure body at a fourth point of articulation, and the fourth flexible tie connecting the second rigid support member to the second pressure body,
   wherein the longitudinal axis of the first flexible tie forms a first acute angle with the vertical axis in such a manner that the first acute angle decreases as a tensile force applied along the vertical axis increases,
   wherein the longitudinal axis of the second flexible tie forms a second acute angle with the vertical axis in such a manner that the second acute angle decreases as the tensile force applied along the vertical axis increases,
   wherein the longitudinal axis of the third flexible tie forms a third acute angle with the vertical axis in such a manner that the third acute angle decreases as the tensile force applied along the vertical axis increases,
   wherein the longitudinal axis of the fourth flexible tie forms a fourth acute angle with the vertical axis in such a manner that the fourth acute angle decreases as the tensile force applied along the vertical axis increases,
   wherein simultaneously with a churning operation of the damping body a pendulum movement of the first pressure body about at least one of the first point of articulation and the third point of articulation and a pendulum movement of the second pressure body about at least one of the second point of articulation and the fourth point of articulation takes place, on account of which, a vertical oscillation introduced is largely eliminated and, on account thereof, not introducible into a tie connected to the load-bearing means.

2. Oscillation damper according to claim 1, characterized in that the damping body bulges outwardly in a constant curve.

3. Oscillation damper according to claim 1, characterized in that the coupling member is composed of a resilient material.

4. Oscillation damper according to claim 1, characterized in that the coupling member is a steel cable extending axially through the clearance of the damping body.

5. Oscillation damper according to claim 1, characterized in that the coupling member is a steel helical spring under tensile load comprising at least one winding.

6. Oscillation damper according to claim 1, characterized in that the hollow spring of the damping body comprises:
   a central cylindrical longitudinal region;
   a first conically truncated longitudinal portion extending from the central cylindrical region and tapering off towards the first end side of the damping body; and
   a second conically truncated longitudinal portion opposite the first conically truncated portion, the second conically truncated longitudinal portion extending from the central cylindrical region and tapering off towards the second end side of the damping body.

7. Oscillation damper according to claim 1, characterized in that the clearance extending through the hollow spring of the damping body comprises:
   a first cylindrical end region at the first end side;
   a first truncated cone portion connected to the first cylindrical end region, the first truncated cone portion widening away from the first cylindrical end region;
   a cylindrical central region connected to the first truncated cone portion opposite the first cylindrical end region;
   a second truncated cone portion connected to the cylindrical central region opposite the first truncated cone portion, the second truncated cone portion tapering off away from the cylindrical central region; and
   a second cylindrical end region connected to the second truncated cone portion opposite the cylindrical central region, the second cylindrical end region at the second end side.

8. Oscillating damper according to claim 1, further comprising:
a first rigid guide sleeve connected to the first pressure body; and
a second rigid guide sleeve connected to the second pressure body,
wherein the first guide sleeve and the second guide sleeve engage in a form-fitting manner in the clearance of the damping body and center the damping body in relation to the first pressure body and the second pressure body.

9. Oscillation damper according to claim 1, characterized in that:
the first rigid support member comprises:
two steel plates spaced apart from one another;
a first bolt extending between the two steel plates; and
a second bolt extending between the two steel plates;
the second rigid support member comprises:
two steel plates spaced apart from one another;
a first bolt extending between the two steel plates; and
second bolt extending between the two steel plates;
the first flexible tie comprises a steel cable configured as an endless loop disposed on the first bolt of the first rigid support member;
the second flexible tie comprises a steel cable configured as an endless loop disposed on the second bolt of the first rigid support member;
the third flexible tie comprises a steel cable configured as an endless loop disposed on the first bolt of the second rigid support member; and
the fourth flexible tie comprises a steel cable configured as an endless loop disposed on the second bolt of the second rigid support member.

10. Oscillating damper according to claim 1, further comprising:
a longitudinal axis of the first pressure body;
a longitudinal axis of the second pressure body;
a first bearing connected to the first pressure body transverse to the longitudinal axis of the first pressure body; and
a second bearing connected to the second pressure body transverse to the longitudinal axis of the second pressure body,
wherein the coupling member is releasably connected to the first pressure body by way of the first bearing and connected to second pressure body by way of the second bearing.

11. Oscillation damper according to claim 10, characterized in that at least one of the first bearing and the second bearing is an arrestable tension adjusting bearing.

12. Oscillation damper for vibration drivers comprising:
a vertical axis;
a load-bearing means;
a first rigid support member connected to the load bearing means;
a second rigid support member spaced apart from the first rigid support member along the vertical axis;
a first pressure body composed of steel;
a second pressure body composed of steel; the second pressure body spaced apart from the first pressure body;
a first rigid lever arm pivotly connected to the first rigid support member and connected to the first pressure body at a first point of articulation;
a second rigid lever arm pivotly connected to the first rigid support member and connected to the second pressure body at a second point of articulation;
a third rigid lever arm pivotly connected to the second rigid support member and connected to the first pressure body at a third point of articulation;
a fourth rigid lever arm pivotly connected to the second rigid support member and connected to the second pressure body at a fourth point of articulation; and
a first damping body between the first rigid support member and the second rigid support member, the first damping body comprising:
a hollow spring composed of at least one of a rubber and a resilient elastomer;
a first end side connected to the first pressure body;
a second end side opposite the first end side, the second end side connected to the second pressure body;
a clearance extending from the first end side to the second end side and through the hollow spring; and
a coupling member extending through the clearance and connected to the first pressure body and the second pressure body, said coupling member having a pre-tension pulling the first pressure body and the second pressure together.

13. Oscillation damper according to claim 12, further comprising:
a longitudinal axis of the first damping body;
a second damping body spaced apart from the first damping body, the second damping body comprising:
a longitudinal axis parallel to the longitudinal axis of the first damping body:
a hollow spring composed of at least one of a rubber and a resilient elastomer;
a first end side connected to the first pressure body;
a second end side opposite the first end side, the second end side connected to the second pressure body;
a clearance extending from the first end side to the second end side and through the hollow spring; and
a coupling member extending through the clearance and connected to the first pressure body and the second pressure body,
wherein the second damping body has a size the same as the first damping body, and the second damping body has a shape the same as the first damping body, a longitudinal axis of the first rigid lever arm;
a longitudinal axis of the second rigid lever arm;
a longitudinal axis of the third rigid lever arm; and
a longitudinal axis of the fourth rigid lever arm,
wherein the longitudinal axis of the first lever arm forms a first acute angle with the vertical axis in such a manner that the first acute angle decreases as a tensile force applied along the vertical axis increases,
wherein the longitudinal axis of the second lever arm forms a second acute angle with the vertical axis in such a manner that the second acute angle decreases as the tensile force applied along the vertical axis increases,
wherein the longitudinal axis of the third lever arm forms a third acute angle with the vertical axis in such a manner that the third acute angle decreases as the tensile force applied along the vertical axis increases,
wherein the longitudinal axis of the fourth lever arm forms a fourth acute angle with the vertical axis in such a manner that the fourth acute angle decreases as the tensile force applied along the vertical axis increases,
wherein simultaneously with a churning operation of the first damping body and a churning operation of the second damping body a pendulum movement of the first pressure body about at least one of the first point of articulation and the third point of articulation and a pendulum movement of the second pressure body about at least one of the second point of articulation and the fourth point of articulation takes place, on account of which a vertical oscillation introduced is not introducible into a tie connected to the load-bearing means.

14. Oscillation damper for vibration drivers comprising:
a vertical axis;
a load-bearing means;
a first rigid support member connected to the load bearing means;
a second rigid support member spaced apart from the first rigid support member along the vertical axis;
a first pressure body composed of steel and comprising a longitudinal axis;
a second pressure body composed of steel and comprising a longitudinal axis, the second pressure body spaced apart from the first pressure body;
a first bearing connected to the first pressure body transverse to the longitudinal axis of the first pressure body; and
a second bearing connected to the second pressure body transverse to the longitudinal axis of the second pressure body;
a damping body comprising:
  a hollow spring composed of at least one of rubber and a resilient elastomer;
  a first end side connected to the first pressure body;
  a second end side opposite the first end side, the second end side connected to the second pressure body;
  a clearance extending from the first end side to the second end side and through the hollow spring; and
  a coupling member extending through the clearance and connected to the first pressure body and the second pressure body, wherein the coupling member is releasably connected to the first pressure body by way of the first bearing and connected to second pressure body by way of the second bearing;
a first flexible tie having a longitudinal axis, the first flexible tie connected to the first pressure body at a first point of articulation, and the first flexible tie connecting the first rigid support member to the first pressure body;
a second flexible tie having a longitudinal axis, the second flexible tie connected to the second pressure body at a second point of articulation, and the second flexible tie connecting the first rigid support member to the second pressure body;
a third flexible tie having a longitudinal axis, the third flexible tie connected to the first pressure body at a third point of articulation, and the third flexible tie connecting the second rigid support member to the first pressure body; and
a fourth flexible tie having a longitudinal axis, the fourth flexible tie connected to the second pressure body at a fourth point of articulation, and the fourth flexible tie connecting the second rigid support member to the second pressure body,
wherein the longitudinal axis of the first flexible tie forms a first acute angle with the vertical axis in such a manner that the first acute angle decreases as a tensile force applied along the vertical axis increases,
wherein the longitudinal axis of the second flexible tie forms a second acute angle with the vertical axis in such a manner that the second acute angle decreases as the tensile force applied along the vertical axis increases,
wherein the longitudinal axis of the third flexible tie forms a third acute angle with the vertical axis in such a manner that the third acute angle decreases as the tensile force applied along the vertical axis increases,
wherein the longitudinal axis of the fourth flexible tie forms a fourth acute angle with the vertical axis in such a manner that the fourth acute angle decreases as the tensile force applied along the vertical axis increases,
wherein simultaneously with a churning operation of the damping body a pendulum movement of the first pressure body about at least one of the first point of articulation and the third point of articulation and a pendulum movement of the second pressure body about at least one of the second point of articulation and the fourth point of articulation takes place, on account of which, a vertical oscillation introduced is largely eliminated and, on account thereof, not introducible into a tie connected to the load-bearing means.

15. Oscillation damper according to claim 14, characterized in that at least one of the first bearing and the second bearing is an arrestable tension adjusting bearing.

* * * * *